(12) United States Patent
Ishida

(10) Patent No.: US 6,928,815 B2
(45) Date of Patent: Aug. 16, 2005

(54) MASTER CYLINDER HAVING A SEAL RETAINER

(75) Inventor: Satoshi Ishida, Chiryu (JP)

(73) Assignee: Advics Co., Ltd., Kariya (JP)

( * ) Notice: Subject to any disclaimer, the term of this patent is extended or adjusted under 35 U.S.C. 154(b) by 37 days.

(21) Appl. No.: 10/753,398

(22) Filed: Jan. 9, 2004

(65) Prior Publication Data

US 2004/0144248 A1 Jul. 29, 2004

(30) Foreign Application Priority Data

Jan. 29, 2003 (JP) .................................... 2003-020166

(51) Int. Cl.$^7$ ................................................ F15B 7/08
(52) U.S. Cl. ...................................... 60/588; 92/169.1
(58) Field of Search ........................... 60/588; 92/169.1; 29/451, 235; 277/434, 436, 437, 438, 439, 449, 451, 456, 450

(56) References Cited

U.S. PATENT DOCUMENTS

| | | | |
|---|---|---|---|
| 2,815,970 A | * 12/1957 | Wallace ...................... | 277/563 |
| 3,605,238 A | 9/1971 | Eschholz et al. | |
| 3,990,138 A | 11/1976 | Bellia | |
| 4,141,129 A | * 2/1979 | Martini ........................ | 29/235 |
| 4,222,161 A | * 9/1980 | Duval et al. .................. | 29/235 |
| 4,610,834 A | * 9/1986 | Baron et al. ................. | 264/249 |
| 4,706,970 A | * 11/1987 | Ramirez ...................... | 277/556 |
| 4,964,274 A | * 10/1990 | Bacardit ...................... | 60/588 |
| 5,187,934 A | * 2/1993 | Mori ........................... | 60/562 |
| 5,431,014 A | * 7/1995 | Ishihara ....................... | 60/562 |
| 6,098,987 A | * 8/2000 | McBride ...................... | 277/436 |
| 6,108,884 A | * 8/2000 | Castleman et al. ........... | 29/235 |
| 6,581,380 B2 | * 6/2003 | Dangel et al. ................ | 60/588 |
| 6,769,254 B2 | * 8/2004 | Heller et al. .................. | 60/589 |
| 6,786,489 B1 | * 9/2004 | Hennemann et al. ........ | 277/437 |

FOREIGN PATENT DOCUMENTS

| | | | |
|---|---|---|---|
| DE | 24 44 896 A | 4/1975 | |
| EP | 191919 A2 | * 8/1986 | ........... E21D/15/44 |
| JP | 2554584 | 7/1997 | |

OTHER PUBLICATIONS

Translation of Official Letter of the German Patent Office.

* cited by examiner

Primary Examiner—Edward K. Look
Assistant Examiner—Igor Kershteyn
(74) Attorney, Agent, or Firm—Burns, Doane, Swecker & Mathis, LLP

(57) ABSTRACT

The present invention is directed to a master cylinder provided with an annular seal member (S1) having an annular groove of U-shaped cross section formed on its one end face, and a substantially annular seal retainer (30) for restricting at least axial movement of the seal member, and including a substantially annular lifted wall portion (31) formed to extend axially into the U-shaped annular groove of the seal member, and a substantially annular step portion (32) formed on an inner periphery of the lifted wall portion, for contacting an open end face of the seal member. The seal retainer is reduced in diameter by radial pressing force produced when it is received in a cylinder bore (1), and restored when the pressing force is released. The seal member is placed in an annular hold groove (1d), and the seal retainer is received from an open end of the cylinder bore to be placed in an annular transfer groove (1b), with the seal retainer reduced in diameter. Then, the seal retainer is transferred from the annular transfer groove to an annular hold groove (1c), and the seal retainer is restored in such a state that the lifted wall portion extends into the U-shaped annular groove of the seal member.

11 Claims, 7 Drawing Sheets

MASTER CYLINDER HAVING A SEAL RETAINER

This application claims priority under 35 U.S.C. Sec.119 to No.2003-020166 filed in Japan on Jan. 29, 2003, the entire content of which is herein incorporated by reference.

BACKGROUND OF THE INVENTION

1. Field of the Invention

The present invention relates to a master cylinder with an annular seal member retained by an annular seal retainer for restricting at least axial movement of the seal member in response to a movement of a master piston. Also, the invention relates to the seal retainer for use in the master cylinder, and relates to a method for installing the seal retainer in the master cylinder.

2. Description of the Related Arts

Heretofore, there are known various kinds of master cylinders for supplying hydraulic braking pressure into wheel brake cylinders, as disclosed in Japanese Utility-model Publication No.2554584, for example. In this publication, there is disclosed such a master cylinder that includes a primary piston and a secondary piston accommodated in a cylinder bore, and proposed is an improvement in a structure for preventing the secondary piston from moving toward the primary piston by more than a predetermined distance due to variation of pressure in the first hydraulic chamber and second hydraulic chamber. In the publication, there are disclosed a primary cup and a secondary cup having an approximately C-shaped cross section, respectively, and cup support members (42 and 43 in FIG. 1 of the publication) for preventing those cups from moving in response to the movement of the piston.

According to the master cylinder as disclosed in the publication, a guide member and a cover are placed at a rear end portion of a cylinder (housing) to constitute a part of the cylinder, so as to support the secondary piston. As apparent from this structure of the master cylinder, the rear end portion of the cylinder is formed with stepped bores whose inner diameters are gradually enlarged rearward (toward a brake pedal), and into which the cup support member for restricting the movement of a cup-like seal member, the seal member, a guide member and the cover are assembled in sequence. Although the number of parts is large and the assembling time is long according to the master cylinder as described above, it was impossible in effect to insert an annular cup support member from the cylinder bore having a smaller diameter than the diameter of the cup support member. Therefore, any particular effort has not been given to produce a master cylinder having a different structure from that of the master cylinder as described above. As a result, the master cylinder has been produced at a relatively high cost.

In view of those backgrounds in this technical field, supposing that the seal retainer could be inserted into the cylinder bore in such a state that the seal retainer is reduced in diameter in advance, then the seal retainer could be received in a groove formed in the cylinder bore to hold the seal retainer, and then enlarged in diameter, not only the reduction of the number of parts could be achieved, but also a large amount of reduction in assembling time could be made.

SUMMARY OF THE INVENTION

Accordingly, it is an object of the present invention to provide a master cylinder having a seal retainer installed therein, with a simple and inexpensive structure capable of installing the seal retainer in the master cylinder certainly.

Also, it is another object of the present invention to provide a seal retainer capable of being installed in a master cylinder certainly, and capable of restricting at least an axial movement of an annular seal member appropriately.

And, it is a further object of the present invention to provide a method for installing a seal retainer in a master cylinder easily and certainly.

In order to accomplish the above and other objects, the master cylinder is provided with a master piston slidably received in a cylinder bore, with a plurality of annular grooves formed around an inner wall of the cylinder bore. The master cylinder includes an annular seal member which has an annular groove of U-shaped cross section formed on one end face thereof, and which is placed in such a manner that the annular groove of U-shaped cross section is opened forward in the cylinder bore. The master cylinder further includes a substantially annular seal retainer which is placed in front of the seal member for restricting at least axial movement of the seal member, and which includes a substantially annular lifted wall portion formed to extend axially into the annular groove of the seal member, and a substantially annular step portion formed on an inner periphery of the lifted wall portion, for contacting an open end face of the annular groove of the seal member. The seal retainer is reduced in diameter by radial pressing force produced when the seal retainer is received in the cylinder bore, and restored when the pressing force is released. And, the annular grooves includes an annular transfer groove and an annular hold groove having a larger diameter than the annular transfer groove, which are formed in parallel with each other toward one open end of the cylinder bore. The seal member is placed in the annular hold groove, and the seal retainer is received from the other open end of the cylinder bore to be placed in the annular transfer groove, with the seal retainer reduced in diameter, and the seal retainer is transferred from the annular transfer groove to the annular hold groove, and the seal retainer is restored in such a state that the lifted wall portion extends into the annular groove of the seal member.

In the master cylinder as described above, the annular hold groove may be formed into stepped grooves to provide a small diameter groove for holding the seal retainer, and a large diameter groove for holding the seal member. The small diameter groove is larger in diameter than the annular transfer groove.

Preferably, the seal retainer according to the present invention includes a substantially annular lifted wall portion which is formed to extend axially into the annular groove of U-shaped cross section of the seal member, and a substantially annular step portion which is formed on an inner periphery of the lifted wall portion to contact an open end face of the annular groove of the seal member. It is so constituted that the seal retainer is reduced in diameter by pressing force produced when the seal retainer is received in the cylinder bore, and that the seal retainer is restored, when the seal retainer is received in the annular hold groove through the annular transfer groove. A cut-out section may be formed on a part of the periphery of the seal retainer.

The method for installing the seal retainer according to the present invention may comprise the steps of (1) placing the seal member in the annular hold groove in such a manner that the annular groove of U-shaped cross section of the seal member is opened forward in the cylinder bore, (2) inserting the seal retainer from an open end of the cylinder bore to be placed in the annular transfer groove, with the seal retainer reduced in diameter, wherein a substantially annular lifted wall portion is formed to extend axially into the annular groove of the seal member, and a substantially annular step portion is formed on an inner periphery of the lifted wall portion, for contacting an open end face of the annular groove of the seal member, and (3) transferring the seal retainer from the annular transfer groove to the annular hold groove, so that the seal retainer is restored in such a state that the lifted wall portion extends into the annular groove of U-shaped cross section of the seal member.

In the method as described above, a first tool having a columnar portion and a second tool having a cylindrical portion for receiving therein the columnar portion to be slidable may be provided. Accordingly, the method may comprise the steps of (1) inserting the seal retainer and the first tool into the second tool to hold the seal retainer with the diameter thereof reduced, in the cylindrical portion, and (2) pushing the first tool rearward to transfer the seal retainer from the cylinder bore to the annular transfer groove, then (3) pushing the first tool and the second tool rearward to transfer the seal retainer from the annular transfer groove to the annular hold groove, to restore the seal retainer in such a state that the lifted wall portion extends into the annular groove of the seal member.

The first tool may include a flange portion which is formed on an end of the columnar portion to provide a larger diameter than the columnar portion, and the second tool may include a cylindrical portion whose inner diameter is substantially equal to the outer diameter of the columnar portion, and which receives the columnar portion to be slidable, and a flange portion which extends from an end of the cylindrical portion to enlarge the diameter thereof.

Accordingly, the method may be achieved by (1) inserting the seal retainer and the first tool into the second tool to hold the seal retainer with the diameter thereof reduced, in the cylindrical portion, and then (2) pushing the first tool rearward to make the flange portion of the first tool abut on the flange portion of the second tool, and (3) pushing further the first tool to transfer the seal retainer from the cylinder bore to the annular transfer groove, and further (4) pushing the first tool and the second tool in a body rearward to make the cylindrical portion of the second tool abut on the seal retainer, and then (5) pushing the first tool and second tool rearward, to transfer the seal retainer from the annular transfer groove to the annular hold groove.

Or, the method may be achieved by (1) inserting the seal retainer and the first tool into the second tool to hold the seal retainer with the diameter thereof reduced, in the cylindrical portion, and then (2) pushing the first tool to transfer the seal retainer from the cylinder bore to the annular transfer groove, and then (3) pushing the first tool rearward to make the flange portion of the first tool abut on the flange portion of the second tool, and further (4) pushing the first tool and the second tool in a body rearward to make the cylindrical portion of the second tool abut on the seal retainer, and then (5) pushing the first tool and second tool rearward, to transfer the seal retainer from the annular transfer groove to the annular hold groove.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
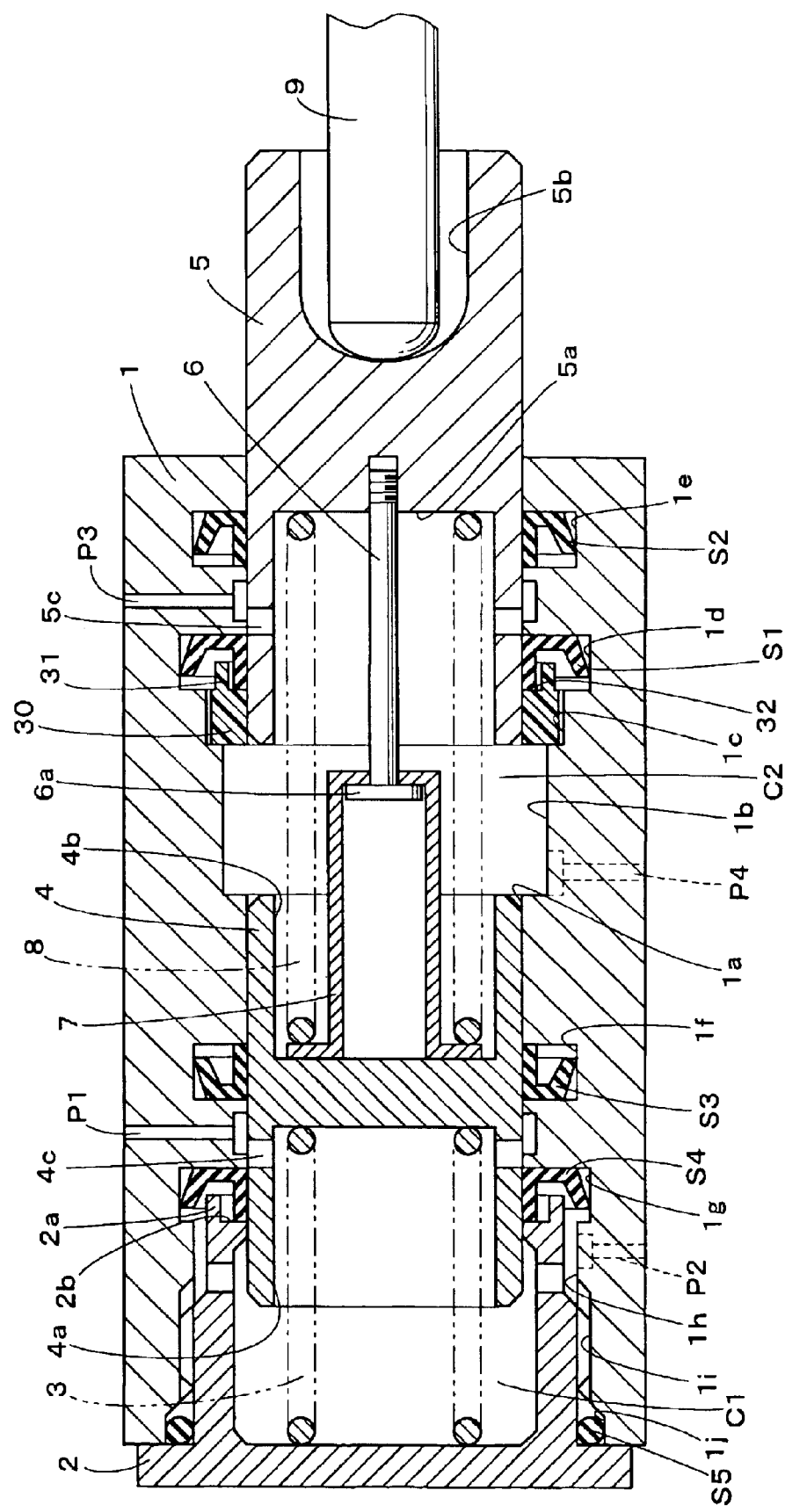
FIG. 1 is a sectional view of a master cylinder according to an embodiment of the present invention.

Referring to FIG. 1, there is illustrated a master cylinder for a vehicle according to an embodiment of the present invention, wherein a tandem master cylinder is provided for supplying hydraulic braking pressure into two hydraulic pressure circuits in response to operation of a brake pedal (not shown), to apply braking force to each wheel of the vehicle. In a cylinder 1 which serves as a body portion of the master cylinder, a cylinder bore 1a is formed through it. In the cylinder bore 1a, there are formed a plurality of annular grooves, which include an annular transfer groove 1b, and two annular hold grooves 1c and 1d having larger diameters than that of the annular transfer groove 1b, toward a rear open end (hereinafter, the right side in FIG. 1 is set to be rear). In addition, an annular groove 1e is formed at a position near the rear open end. Furthermore, annular grooves 1f, 1g and 1h are formed respectively toward a front open end, and a thread groove 1i and an annular groove 1j in front of them.

Figure 5:
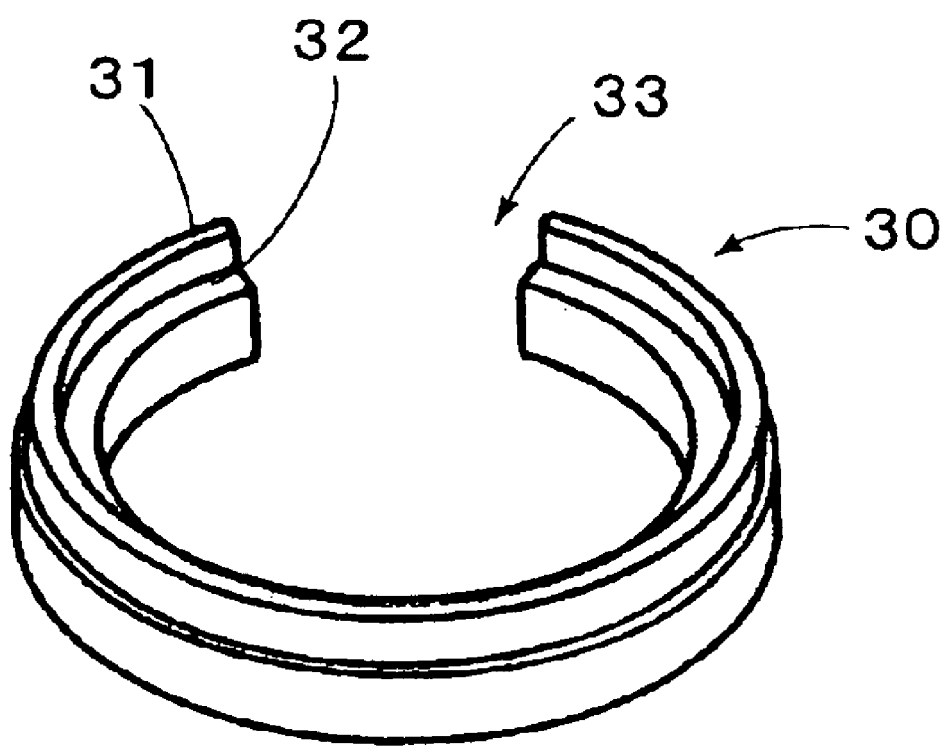
FIG. 5 is a perspective view of a seal retainer for use in a master cylinder according to an embodiment of the present invention.

In the annular hold groove 1c, there is disposed an annular seal retainer 30 as described later in detail. In the annular hold groove 1d which has a larger diameter than the annular hold groove 1c, there is disposed an annular seal member S1 (may be called as a cup seal) having an annular groove of U-shaped cross section (hereinafter, referred to as U-shaped groove) formed on its one end face, in such a manner that the U-shaped groove is opened forward. Likewise, an annular seal member S2 is disposed in the annular groove 1e. In other words, the annular hold grooves according to the present embodiment include dual annular grooves of the annular hold groove 1c which has a larger diameter than the annular transfer groove 1b and which is provided for receiving the seal retainer 30, and the annular hold groove 1d which has a larger diameter than the annular hold groove 1c and which is provided for receiving the seal member S1. These may be constituted by a common (single) annular hold groove, as will be described later with reference to FIGS. 6 and 7. The seal retainer 30 is a plastic member for restricting at least axial movement of the seal member S1, which is formed with an annular lifted wall portion 31 to extend into the U-shaped groove of the seal member S1, and an annular step portion 32 formed at an inner periphery of the lifted wall portion 31 to abut on an open end face of the U-shaped groove of the seal member S1. Furthermore, as shown in FIG. 5, a part of the seal retainer 30 along its periphery has been cut off to form a cut-out portion 33, so that the seal retainer 30 can be reduced in diameter by radial pressing force exerted when it is inserted in the cylinder bore 1a, and can be restored when the pressing force is released.

In the front annular groove 1f, there is disposed an annular seal member S3 with its U-shaped groove opened rearward, whereas in the front annular groove 1g, there is disposed an annular seal member S4 with its U-shaped groove opened forward. Furthermore, a plug member 2 is screwed into the thread groove 1i to close the front opening of the cylinder bore 1a. The plug member 2 is formed into a cylinder with a bottom, which is formed with an annular lifted wall portion 2a and an annular step portion 2b inside of the lifted wall portion 2a. And, the plug member 2 is so arranged that the lifted wall portion 2a extends into the U-shaped groove of the annular seal member S4, and that the annular step portion 2b abuts on an open end face of the U-shaped groove of the seal member S4.

In a front section of the cylinder bore 1a, a return spring 3 is disposed, and a front master piston 4 is accommodated to be fitted into the seal members S3 and S4 fluid-tightly and slidably. According to the present embodiment, the master piston 4 is a cylindrical member formed with recesses 4a and 4b divided by a central partition wall, to provide a master pressure chamber C1 in a space in front of the recess 4a. Then, a return spring 3 is disposed between the bottom surface of the recess 4a of the master piston 4 and the bottom surface of the plug member 2 to press the master piston 4 rearward by its biasing force. Therefore, the master piston 4 is placed at its initial position, in such a state as shown in FIG. 1, so that the master pressure camber C1 is communicated with a port P1 defined on the cylinder 1 through a communication hole 4c. When the master piston 4 is moved forward, the communication hole 4c will be closed by its skirt portion (cylindrical portion), to block its communication with a reservoir (not shown). Therefore, when the master piston 4 in this state is further moved forward, the hydraulic pressure in the master pressure chamber C1 will be increased. The master pressure chamber C1 is also communicated with a port P2 (as shown by a broken line in FIG. 1) at its output side of the master cylinder 1.

In a rear section of the cylinder bore 1a, a rear master piston 5 is accommodated to be fitted into the seal members S1 and S2 fluid-tightly and slidably. According to the present embodiment, the master piston 5 is a cylindrical member formed with recesses 5a and 5b divided by a central partition wall, to provide a master pressure chamber C2 in a space in front of the recess 5a, and a tip-end portion of an input rod 9 is received in the recess 5b. In the recess 5a of the master piston 5, a rod 6 is supported on its central axis. Then, a return spring 8 is disposed between the bottom surface of the recess 5a of the master piston 5 and a retainer 7 engaged with a flange portion 6a of the rod 6, and biased so as to expand the master pressure chamber C2 defined between the master pistons 4 and 5. Therefore, the master piston 5 is placed at its initial position, in such a state as shown in FIG. 1, so that the master pressure camber C2 is communicated with a port P3 defined on the cylinder 1 through a communication hole 5c. The master pressure chamber C2 is also communicated with a port P4 (as shown by a broken line in FIG. 1) at its output side of the cylinder 1.

As described before, the seal retainer 30 is transferred to the annular hold groove 1c, and placed so that its lifted wall portion 31 extends into the U-shaped groove of the seal member S1, and its step portion 32 abuts on the open end face of the U-shaped groove of the seal member S1. Accordingly, the seal retainer 30 is engaged with a step portion formed between the annular transfer groove 1b and the annular hold groove 1c at its front end, and abuts on the open end face of the U-shaped groove of the seal member S1 at its rear end. Consequently, the axial movement of the seal member S1 is restricted, and buckling of the outer side wall portion (sealing portion) which forms the U-shaped groove of the seal member S1, is prevented by the lifted wall portion 31. The ports P1 and P3 of the cylinder 1 are communicated with a reservoir (not shown) for storing the brake fluid, to be under atmospheric pressure, as in the reservoir. The port P2 formed at the output side is communicated with front wheel brake cylinders (not shown), for example, whereas the port P4 is communicated with rear wheel brake cylinders (not shown). In addition, although the drawing is omitted herein, engaging portions have been formed so as to restrict end positions of the master pistons 4 and 5 at those positions as shown in FIG. 1.

In operation, according to the tandem master cylinder of the present embodiment as constituted above, when the brake pedal (not shown) is not depressed, the master pistons 4 and 5 are placed in their initial positions as shown in FIG. 1. When depressing force is applied to the brake pedal, the braking operation force is transmitted to the input rod 9, so that the return spring 3 is compressed and the master piston 4 is advanced to block the communication with the reservoir (not shown) through the communication hole 4c, whereby the hydraulic pressure in the master pressure chamber C1 is increased. Furthermore, the return spring 8 is compressed and the master piston 5 is advanced to block the communication with the reservoir (not shown) through the communication hole 5c, so that the hydraulic pressure in the master pressure chamber C2 is increased. When the hydraulic pressure in the master pressure chambers C1 and C2 are lost, the master pistons 4 and 5 are returned by the biasing force of the return springs 3 and 8 to the positions where the communication holes 4c and 5c are communicated with the ports P1 and P3, respectively, so that the brake fluid in the master pressure chambers C1 and C2 will be returned to the reservoir (not shown).

Figure 2:
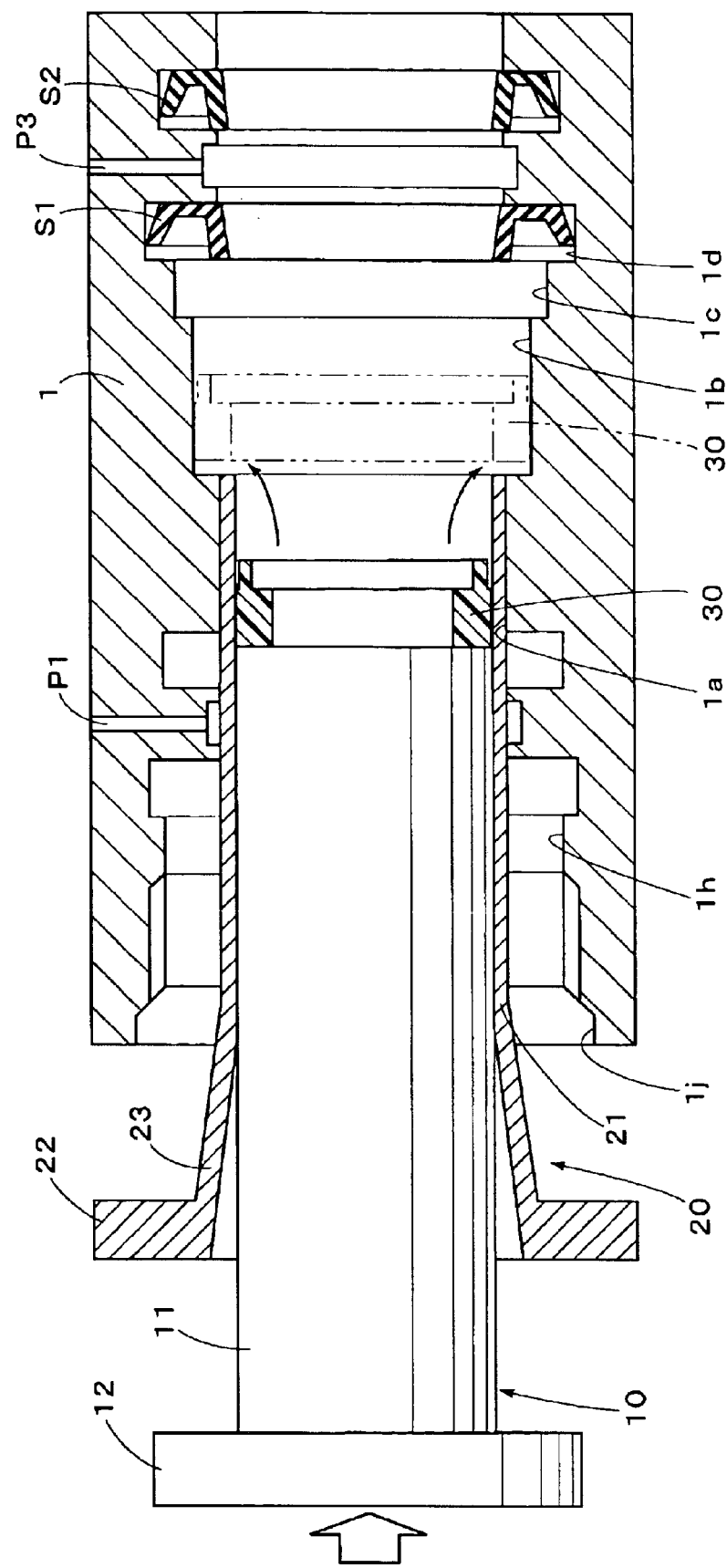
FIG. 2 is a sectional view of a part of a master cylinder showing a state when installing a seal retainer in the master cylinder according to an embodiment of the present invention.

Next will be explained a method for transferring the seal retainer 30 as shown in FIG. 5 to the annular hold groove 1c, with reference to FIGS. 2–4. In order to install the seal retainer 30 according to the present embodiment, a first tool 10 and a second tool 20 are used. As shown in FIG. 2, the first tool 10 has a columnar portion 11 which serves as a pressing portion, and a flange portion 12 which is formed on an end of the columnar portion 11 to be larger in diameter than the columnar portion 11. The second tool 20 has a cylindrical portion 21 whose inner diameter is substantially equal to the outer diameter of the columnar portion 11, and which receives the columnar portion 11 to be slidable, and an annular flange portion 22 which is formed to extend from an end of the cylindrical portion 21 to enlarge its diameter. According to the present embodiment, a tapered portion 23 for a guide is formed between the cylindrical portion 21 and the flange portion 22.

At the outset, as shown in FIG. 2, the seal retainer 30 is inserted into the second tool 20 through its tapered portion 23, and then pushed by the columnar portion 11 of the first tool 10. Consequently, the seal retainer 30 is received in the cylindrical portion 21 in a state with its diameter reduced. In this state, the first tool 10 and the second tool 20 are received in the cylinder bore 1a from the front end of the cylinder 1. Or, after the cylindrical portion 21 of the second tool 20 is inserted into the cylinder bore 1a, the seal retainer 30 may be inserted into the second tool 20 through its tapered portion 23, then pushed by the columnar portion 11 of the first tool 10, so that the seal retainer 30 will be received in the second tool 20 in the state with its diameter reduced. As a result, the seal retainer 30 is placed in the state as shown in FIG. 2. Then, the flange portion 12 of the first tool 10 is pushed rearward, and when the flange portion 12 of the first tool 10 abuts on the flange portion 22 of the second tool 20, the seal retainer 30 is pushed outside of the cylindrical portion 21 of the second tool 20, so that the seal retainer 30 is transferred from the cylinder bore 1*a* to the annular transfer groove 1*b*. Consequently, the seal retainer 30 is enlarged in diameter by its elastic force to be placed in a state as shown in FIG. 3, wherein two-dot chain lines indicate the state as shown in FIG. 2. Or, it may be so constituted that the flange portion 12 of the first tool 10 is moved rearward, with the seal retainer 30 reduced in diameter, the seal retainer 30 is pushed outside of the cylindrical portion 21 of the second tool 20, then, after the seal retainer 30 is placed from the cylinder bore 1*a* to the annular transfer groove 1*b*, the flange portion 12 of the first tool 10 will abut on the flange portion 22 of the second tool 20.

Figure 3:
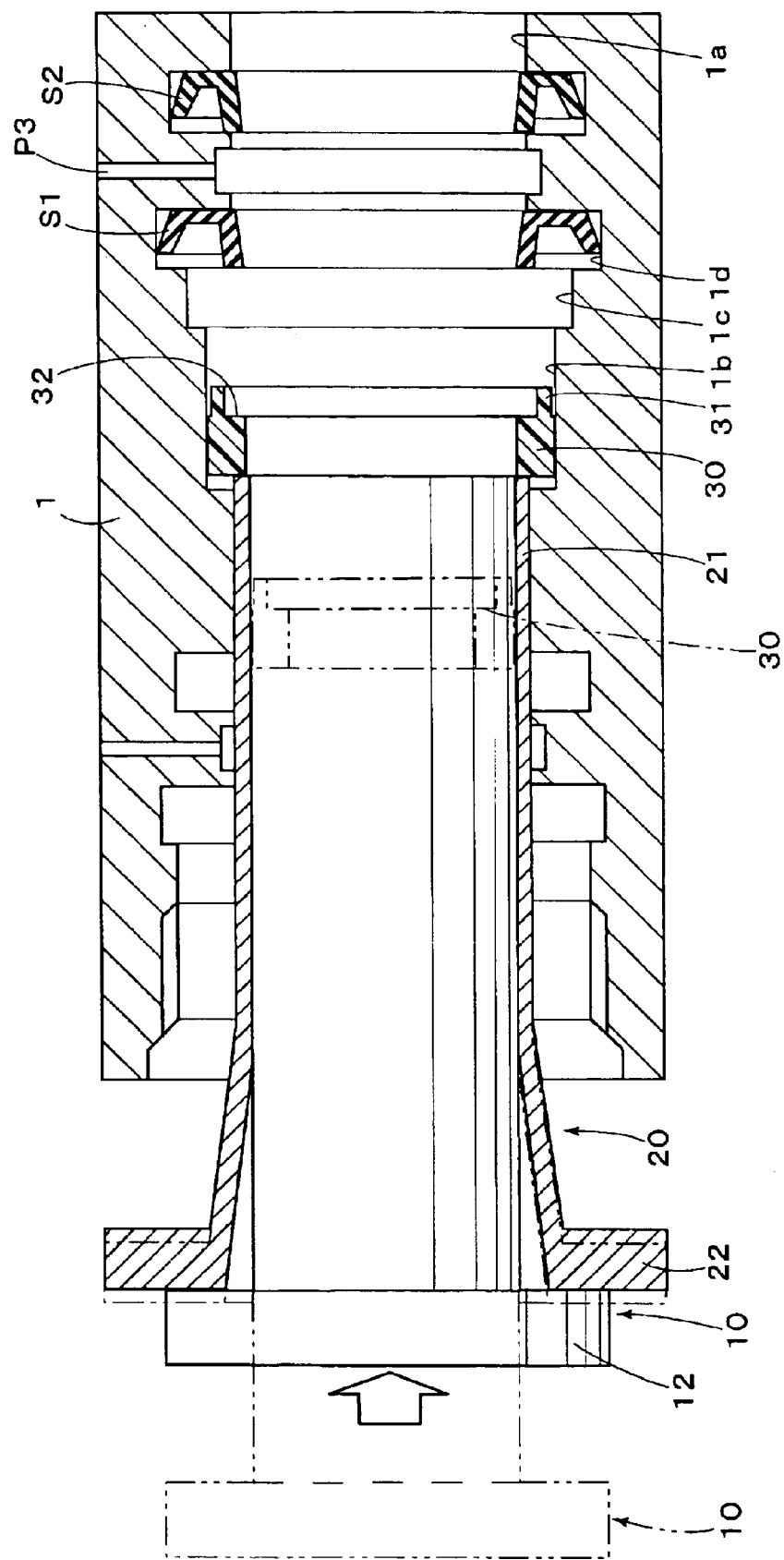
FIG. 3 is a sectional view of a part of a master cylinder showing another state when installing a seal retainer in the master cylinder according to an embodiment of the present invention.
Figure 4:
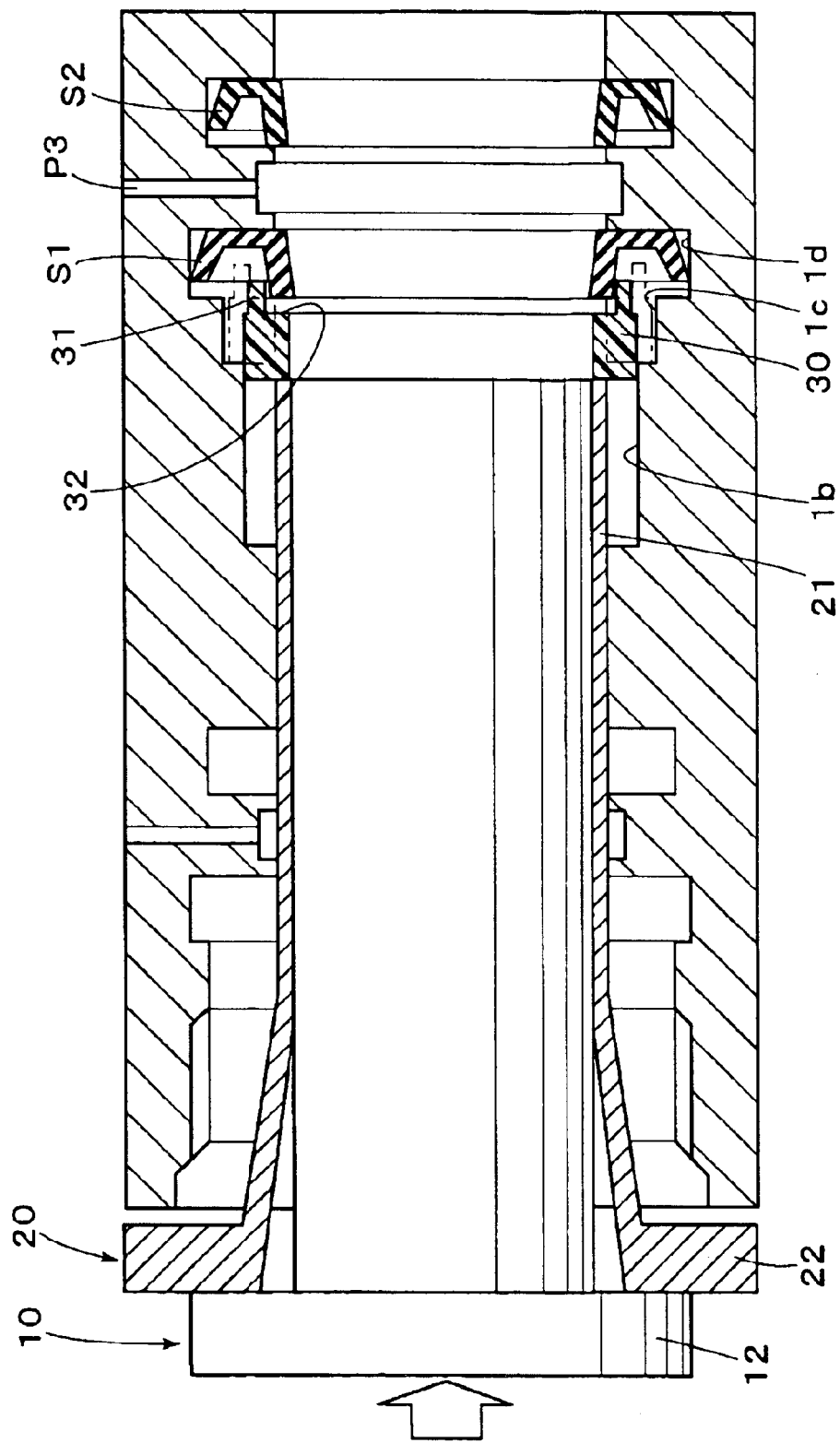
FIG. 4 is a sectional view of a part of a master cylinder showing a further state when installing a seal retainer in the master cylinder according to an embodiment of the present invention.

In the state as shown in FIG. 3, when the first tool 10 and the second tool 20 are moved rearward in a body, the cylindrical portion 21 of the second tool 20 abuts on the seal retainer 30. And, when the first tool 10 and the second tool 20 are moved rearward further, the seal retainer 30 is removed from the annular transfer groove 1*b*. Then, the seal retainer 30 is transferred into the annular hold groove 1*c*, with the lifted wall portion 31 of the seal retainer 30 extended into the U-shaped groove of the seal member S1, as indicated by two-dot chain line in FIG. 4. Consequently, the seal retainer 30 is released from the pressing force applied thereto, to be placed in a restored state which is approximately the same as the initial state. That is, the seal retainer 30 is certainly held within the annular hold groove 1*c*, in the state with the lifted wall portion 31 extended into the U-shaped groove of the seal member S1, as shown in FIG. 1. Thus, the axial movement of the seal member S1 can be prevented appropriately, with the rotation of the seal member S1 being prevented.

Figure 6:
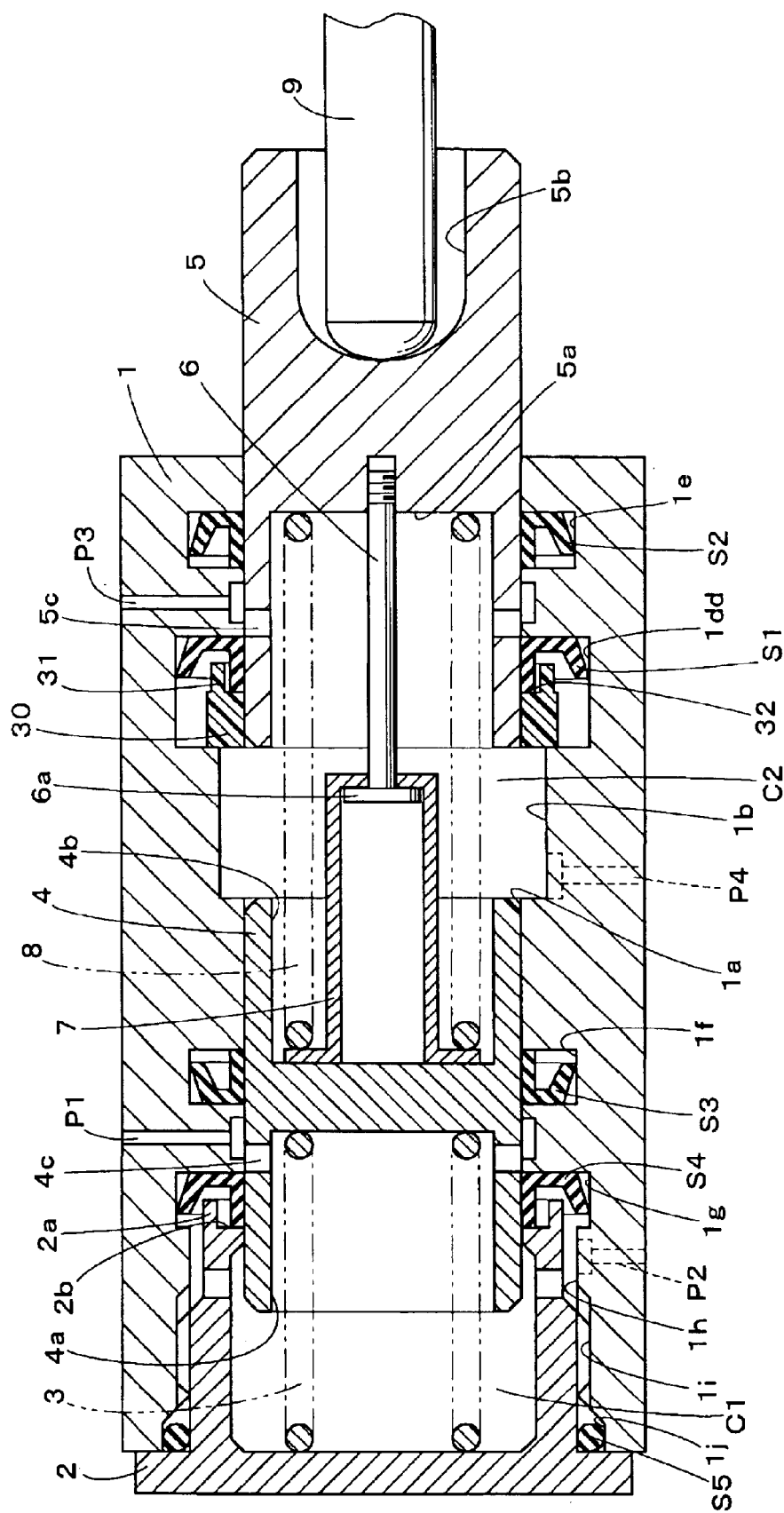
FIG. 6 is a sectional view of a master cylinder according to another embodiment of the present invention.
Figure 7:
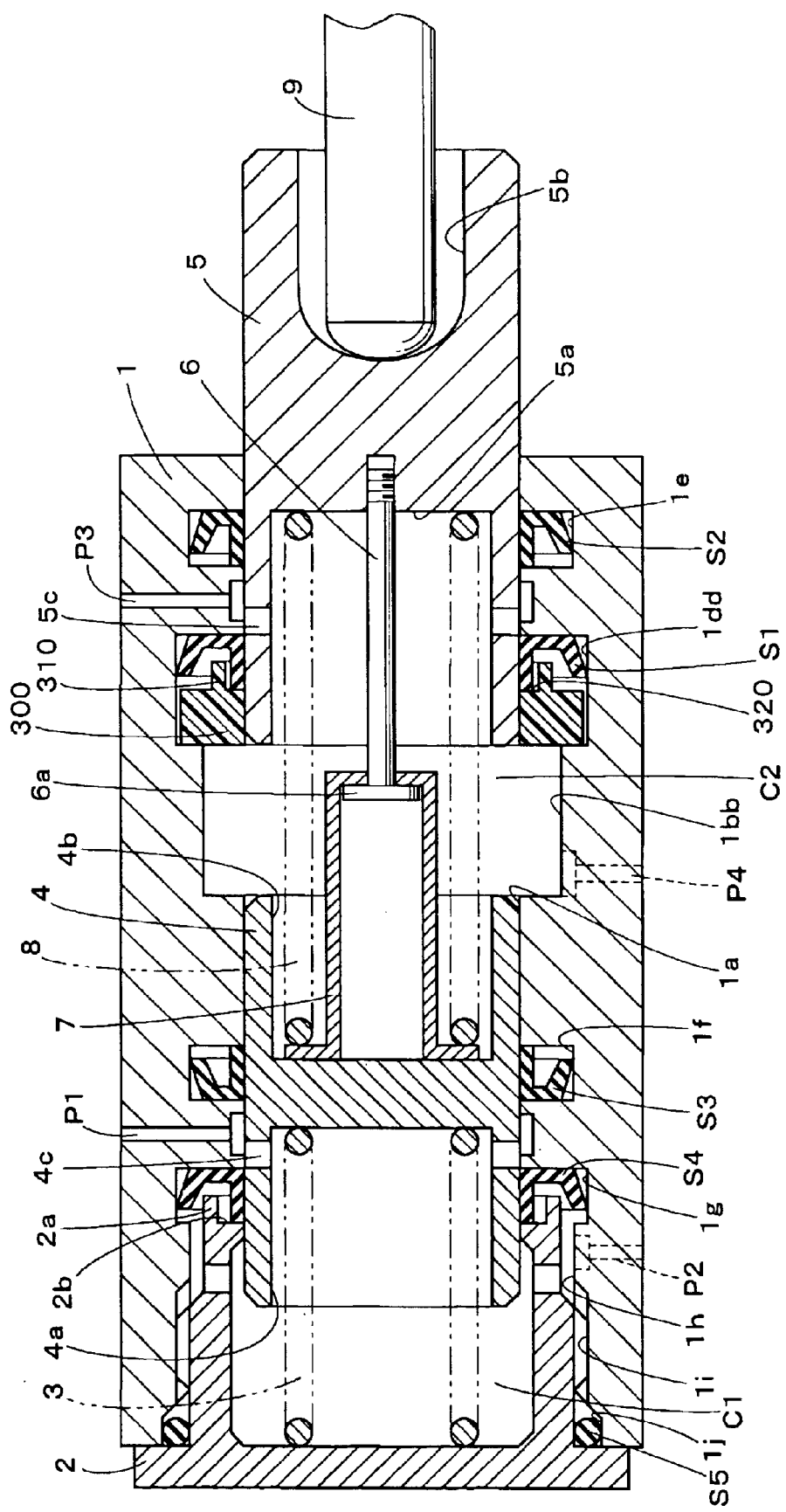
FIG. 7 is a sectional view of a master cylinder according to a further embodiment of the present invention.

According to the above-described embodiment, the annular hold groove is constituted by the dual annular grooves of the annular hold groove 1*c* for the seal retainer 30 and the annular hold groove 1*d* for the seal member S1, whereas the annular hold grooves may be constituted by a common one as shown in FIGS. 6 and 7. According to the embodiment as shown in FIG. 6, instead of the annular hold grooves 1*c* and 1*d*, there is formed an annular hold groove 1*dd* which has the same diameter as that of the annular hold groove 1*d*, and which has a longer axial dimension than that of the annular hold groove 1*d*. And, the seal retainer 30 and the seal member S1 are held in the annular hold groove 1*dd*. In this case, a large space is defined outside of the outer periphery of the seal retainer 30. However, the seal retainer 30 is not be moved radially, as the outer peripheral surface of the master piston 5 abuts on the inner peripheral surface of the seal retainer 30. As the remaining structure is substantially the same as the structure as shown in FIG. 1, its explanation is omitted herein, with the same reference numerals given to substantially the same elements as shown in FIG. 1.

Next, according to the embodiment as shown in FIG. 7, instead of the annular transfer groove 1*b* as shown in FIG. 1, there is formed an annular transfer groove 1*bb* which has the same diameter as that of the annular hold groove 1*c*, and instead of the annular hold grooves 1*c* and 1*d*, there is formed an annular hold groove 1*dd* which has the same diameter as that of the annular hold groove 1*d*, and which has a longer axial dimension than that of the annular hold groove 1*d*. And, instead of the seal retainer 30 as shown in FIG. 1, a seal retainer 300 is used, so that the seal retainer 300 and the seal member S1 are held in the annular hold groove 1*dd*. The seal retainer 300 is formed with an annular lifted wall portion 310 and an annular step portion 320, as the lifted wall portion 31 and the step portion 32 for the seal retainer 30, so that the seal retainer 300 has the same function as that of the seal retainer 30, while the outer peripheral surface of the seal retainer 300 extends into the vicinity of the inner periphery of the annular hold groove 1*dd*, so that the seal retainer 300 is formed larger in diameter than the seal retainer 30. As the remaining structure is substantially the same as the structure as shown in FIG. 1, its explanation is omitted herein, with the same reference numerals given to substantially the same elements as shown in FIG. 1.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A master cylinder having a master piston slidably received in a cylinder bore, with a plurality of annular grooves formed around an inner wall of said cylinder bore, comprising:

an annular seal member having an annular groove of U-shaped cross section formed on one end face thereof, said seal member being placed in such a manner that the annular groove of U-shaped cross section is opened forward in said cylinder bore; and a substantially annular seal retainer placed in front of said seal member for restricting at least axial movement of said seal member, said seal retainer including a substantially annular lifted wall portion formed to extend axially into the annular groove of said seal member, and a substantially annular step portion formed on an inner periphery of said lifted wall portion, for contacting an open end face of the annular groove of said seal member, said seal retainer being reduced in diameter by radial pressing force produced when said seal retainer is received in said cylinder bore, and restored when the pressing force is released, wherein said annular grooves includes an annular transfer groove and an annular hold groove having a larger diameter than said annular transfer groove, formed in parallel with each other toward one open end of said cylinder bore, and wherein said seal member is placed in said annular hold groove, and said seal retainer is received from the other open end of said cylinder bore to be placed in said annular transfer groove, with said seal retainer reduced in diameter, and wherein said seal retainer is transferred from said annular transfer groove to said annular hold groove, and said seal retainer is restored in such a state that said lifted wall portion extends into the annular groove of said seal member.

2. A master cylinder as set forth in claim 1, wherein said annular hold groove is formed into stepped grooves to provide a small diameter groove for holding said seal retainer, and a large diameter groove for holding said seal member, and wherein said small diameter groove is larger in diameter than said annular transfer groove.

3. A seal retainer for restricting at least axial movement of a seal member having an annular groove of U-shaped cross section formed on one end face thereof, for use in a master cylinder having a master piston slidably received in a cylinder bore, with a plurality of annular grooves formed around an inner wall of said cylinder bore, said annular grooves including an annular transfer groove and an annular hold groove having a larger diameter than said annular transfer groove, formed in parallel with each other toward one open end of said cylinder bore, comprising:

- a substantially annular lifted wall portion formed to extend axially into the annular groove of U-shaped cross section of said seal member; and
- a substantially annular step portion formed on an inner periphery of said lifted wall portion, for contacting an open end face of the annular groove of said seal member,
- wherein said seal retainer is reduced in diameter by pressing force produced when said seal retainer is received in said cylinder bore, and said seal retainer is restored, when said seal retainer is received in said annular hold groove through said annular transfer groove.

4. A seal retainer as set forth in claim 3, wherein said seal retainer has a cut-out section on a part of the periphery of said seal retainer.

5. A seal retainer as set forth in claim 3, wherein said annular hold groove is formed into stepped grooves to provide a small diameter groove for holding said seal retainer, and a large diameter groove for holding said seal member, and wherein said small diameter groove is larger in diameter than said annular transfer groove.

6. A method for installing a seal retainer for restricting at least axial movement of a seal member having an annular groove of U-shaped cross section formed on one end face thereof, in a master cylinder having a master piston slidably received in a cylinder bore, with a plurality of annular grooves formed around an inner wall of said cylinder bore, said annular grooves including an annular transfer groove and an annular hold groove having a larger diameter than said annular transfer groove, formed in parallel with each other toward one open end of said cylinder bore, comprising:

- placing said seal member in said annular hold groove in such a manner that the annular groove of U-shaped cross section of said seal member is opened forward in said cylinder bore;
- inserting said seal retainer from the other open end of said cylinder bore to be placed in said annular transfer groove, with said seal retainer reduced in diameter, said seal retainer including a substantially annular lifted wall portion formed to extend axially into the annular groove of said seal member, and a substantially annular step portion formed on an inner periphery of said lifted wall portion, for contacting an open end face of the annular groove of said seal member; and
- transferring said seal retainer from said annular transfer groove to said annular hold groove, so that said seal retainer is restored in such a state that said lifted wall portion extends into the annular groove of U-shaped cross section of said seal member.

7. A method for installing a seal retainer in a master cylinder as set forth in claim 6, wherein said seal retainer has a cut-out section on a part of the periphery of said seal retainer.

8. A method for installing a seal retainer in a master cylinder as set forth in claim 6, wherein said annular hold groove is formed into stepped grooves to provide a small diameter groove for holding said seal retainer, and a large diameter groove for holding said seal member, and wherein said small diameter groove is larger in diameter than said annular transfer groove, and wherein said seal retainer is transferred from said annular transfer groove to said annular hold groove, so that said seal retainer is restored in such a state that said lifted wall portion extends into the annular groove of said seal member.

9. A method for installing a seal retainer in a master cylinder as set forth in claim 6, wherein a first tool having a columnar portion and a second tool having a cylindrical portion for receiving therein said columnar portion to be slidable are provided for inserting said seal retainer and said first tool into said second tool to hold said seal retainer with the diameter thereof reduced, in said cylindrical portion, and then pushing said first tool rearward to transfer said seal retainer from said cylinder bore to said annular transfer groove, and further pushing said first tool and said second tool rearward to transfer said seal retainer from said annular transfer groove to said annular hold groove, to restore said seal retainer in such a state that said lifted wall portion extends into the annular groove of said seal member.

10. A method for installing a seal retainer in a master cylinder as set forth in claim 9, wherein said first tool includes a flange portion formed on an end of said columnar portion to provide a larger diameter than said columnar portion, and wherein said second tool includes a cylindrical portion whose inner diameter is substantially equal to the outer diameter of said columnar portion, and which receives said columnar portion to be slidable, and a flange portion which extends from an end of said cylindrical portion to enlarge the diameter thereof, and wherein said method is achieved by inserting said seal retainer and said first tool into said second tool to hold said seal retainer with the diameter thereof reduced, in said cylindrical portion, and then pushing said first tool rearward to make said flange portion of said first tool abut on said flange portion of said second tool, and pushing further said first tool to transfer said seal retainer from said cylinder bore to said annular transfer groove, and further pushing rearward said first tool and said second tool in a body to make said cylindrical portion of said second tool abut on said seal retainer, and then pushing said first tool and second tool rearward, to transfer said seal retainer from said annular transfer groove to said annular hold groove.

11. A method for installing a seal retainer in a master cylinder as set forth in claim 9, wherein said first tool includes a flange portion formed on an end of said columnar portion to provide a larger diameter than said columnar portion, and wherein said second tool includes a cylindrical portion whose inner diameter is substantially equal to the outer diameter of said columnar portion, and which receives said columnar portion to be slidable, and a flange portion which extends from an end of said cylindrical portion to enlarge the diameter thereof, and wherein said method is achieved by inserting said seal retainer and said first tool into said second tool to hold said seal retainer with the diameter thereof reduced, in said cylindrical portion, and then pushing said first tool to transfer said seal retainer from said cylinder bore to said annular transfer groove, and then pushing said first tool rearward to make said flange portion of said first tool abut on said flange portion of said second tool, and further pushing rearward said first tool and said second tool in a body to make said cylindrical portion of said second tool abut on said seal retainer, and then pushing said first tool and second tool rearward, to transfer said seal retainer from said annular transfer groove to said annular hold groove.

* * * * *